US012598506B2

(12) United States Patent
Xin et al.

(10) Patent No.: US 12,598,506 B2
(45) Date of Patent: Apr. 7, 2026

(54) TRANSMIT IDENTIFIER TO USER PRIORITY / AC MAPPING

(71) Applicants: SONY GROUP CORPORATION, Tokyo (JP); SONY CORPORATION OF AMERICA, New York, NY (US)

(72) Inventors: Liangxiao Xin, Santa Clara, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 446 days.

(21) Appl. No.: 18/179,041

(22) Filed: Mar. 6, 2023

(65) Prior Publication Data

US 2023/0319620 A1 Oct. 5, 2023

Related U.S. Application Data

(60) Provisional application No. 63/269,333, filed on Mar. 14, 2022.

(51) Int. Cl.
| | |
|---|---|
| *H04W 28/02* | (2009.01) |
| *H04W 74/0816* | (2024.01) |
| *H04W 74/08* | (2024.01) |
| *H04W 84/12* | (2009.01) |

(52) U.S. Cl.
CPC ... *H04W 28/0263* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2012/0230200 A1 | 9/2012 | Wentink | |
| 2021/0100061 A1* | 4/2021 | Park | H04W 76/25 |
| 2021/0160730 A1* | 5/2021 | Fiorani | H04W 28/0252 |
| 2021/0288915 A1 | 9/2021 | Venkatesan | |
| 2021/0329499 A1* | 10/2021 | Canpolat | H04L 63/164 |

(Continued)

FOREIGN PATENT DOCUMENTS

WO    WO-2021216294 A1    10/2021

OTHER PUBLICATIONS

Deng, Cailian et al., "IEEE 802.11be—Extremely High Throughput WLAN: New Challenges and Opportunities", IEEE Communications Surveys & Tutorials, Jul. 2020, pp. 1-32.

(Continued)

*Primary Examiner* — Eunsook Choi
(74) *Attorney, Agent, or Firm* — O'BANION & RITCHEY LLP; John P. O'Banion

(57) ABSTRACT

Enhanced TID-to-UP mapping is performed which allows multiple TIDs to be mapped to the UPs of the same AC. Thus, a first STA can set TID-to-UP mapping for a second STA, whereby TID-to-UP mapping can differentiate the MSDUs or A-MSDUs that are transmitted. In addition, an MSDU/A-MSDU can be classified by TID first, then use TID-to-UP mapping to map it to the corresponding UP. In addition, an SCS traffic stream can assign a TID and a UP to that SCS traffic stream. The use of these enhanced mechanism can enhance low latency performance.

23 Claims, 15 Drawing Sheets

(56) References Cited

U.S. PATENT DOCUMENTS

2021/0329500 A1 *  10/2021  Cariou ............... H04W 74/002
2023/0035989 A1 *   2/2023  Awadin .............. H04W 72/569

OTHER PUBLICATIONS

Adame, Toni et al., "Time-Sensitive Networking in IEEE 8n IEEE 802.11be: On the way to Low-Latency WiFi 7", Sensors, 21, 2021, pp. 1-20.

Murti, Wisnu et al., "Multi-Link Operation with Enhanced Synchronous Channel Access in IEEE 802.11be Wireless LANs: Coexistence Issue and Solutions", IEEE 802.11beWireless LANs: Coexistence Issue and Solutions. Sensors, 21, 7974, 2021, pp. 1-24.

* cited by examiner

QoS Map Element

| Element ID | Length | DSCP Exception List | UP 0 DSCP Range | UP 1 DSCP Range | UP 2 DSCP Range | ... | UP 7 DSCP Range |
|---|---|---|---|---|---|---|---|
| 1 | 1 | n x 2 | 2 | 2 | 2 | | 2 |

Octets:

DSCP Exception

| DSCP Value | User Priority |
|---|---|
| 1 | 1 |

Octets:

DSCP Range

| DSCP Low Value | DSCP High Value |
|---|---|
| 1 | 1 |

Octets:

Intra-AC Priority Element

| Element ID | Length | Intra-Access Priority |
|---|---|---|
| 1 | 1 | 1 |

Octets:

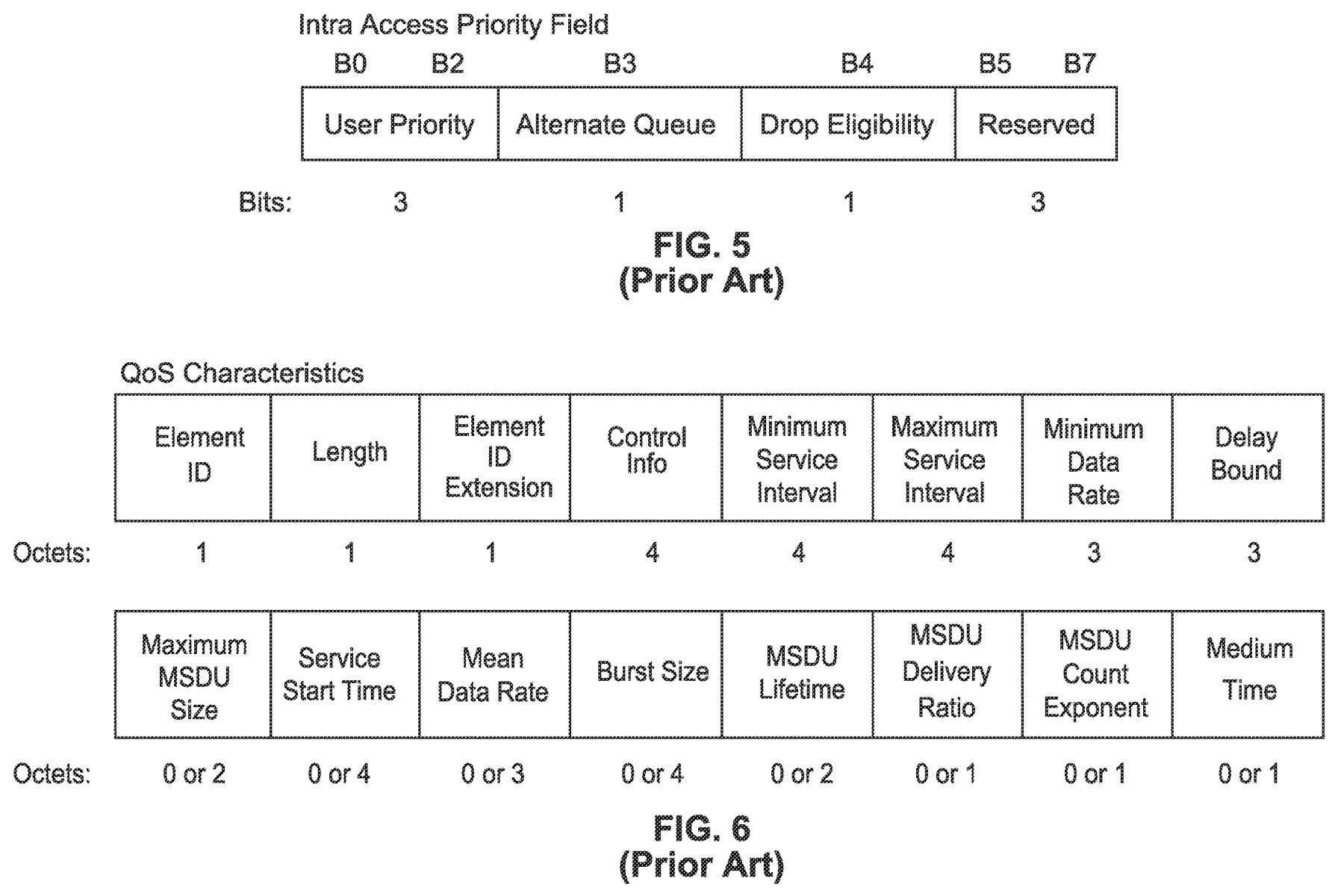

Intra Access Priority Field

| B0 | B2 | B3 | | B4 | | B5 | B7 |
|---|---|---|---|---|---|---|---|
| User Priority | | Alternate Queue | | Drop Eligibility | | Reserved | |
| 3 | | 1 | | 1 | | 3 | |

Bits:

FIG. 5
(Prior Art)

QoS Characteristics

| Element ID | Length | Element ID Extension | Control Info | Minimum Service Interval | Maximum Service Interval | Minimum Data Rate | Delay Bound |
|---|---|---|---|---|---|---|---|
| 1 | 1 | 1 | 4 | 4 | 4 | 3 | 3 |

Octets:

| Maximum MSDU Size | Service Start Time | Mean Data Rate | Burst Size | MSDU Lifetime | MSDU Delivery Ratio | MSDU Count Exponent | Medium Time |
|---|---|---|---|---|---|---|---|
| 0 or 2 | 0 or 4 | 0 or 3 | 0 or 4 | 0 or 2 | 0 or 1 | 0 or 1 | 0 or 1 |

Octets:

FIG. 6
(Prior Art)

TRANSMIT IDENTIFIER TO USER PRIORITY / AC MAPPING

CROSS-REFERENCE TO RELATED APPLICATIONS

This application claims priority to, and the benefit of, U.S. provisional patent application Ser. No. 63/269,333 filed on Mar. 14, 2022, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication systems using CSMA/CA and EDCA in setting up traffic streams according to TID and UP and more particularly to enhanced TID to UP mapping.

2. Background Discussion

In existing 802.11 be protocols, there are constraints on the use of Traffic Identifier (TID) to User Priority (UP) mapping which can significantly impact low latency traffic operations.

Accordingly, a need exists for enhanced mapping mechanisms which can enhance low latency traffic performance. The present disclosure fulfills that need, and provides additional benefits.

BRIEF SUMMARY

The present disclosure provides different mechanisms which can be particularly relevant for enhancing low latency operations.

Communicating transmit identifier-to-user priority (TID-to-UP) mapping to a STA/AP that will be operating as a transmitting STA/AP, from a STA/AP that will be operating as a receiving STA. Classifying frames by TIDs that are sent to the receiving STA. Mapping the traffic of the TID to UP according to the TID-to-UP mapping by the receiving STA.

A receiving STA communicating to establish TID-to-UP mapping with a transmitting STA which uses TID of the traffic stream (TS) for the frames if the frames belong to the traffic stream of the UP. Utilizing the TID of the Traffic Category (TC) for the frames, by the transmitting STA, if the frames do not belong to the traffic stream of the UP, and thus are considered regular traffic.

Performing communication in mapping multiple (more than two) TIDs with values between 0 through 7 to a same AC. A first portion of these multiple TIDs are utilized for regular traffic which is not associated with the traffic streams of the UPs using the AC; while a second portion of the multiple TIDs are utilized for the traffic streams.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 5 is a data field diagram of an existing an Intra-Access Category Priority field.

FIG. 6 is a data field diagram of an existing QoS Characteristics element.

DETAILED DESCRIPTION

1. Introduction

1.1. Current State of the Art

Figures 1, 2, 3, 4:
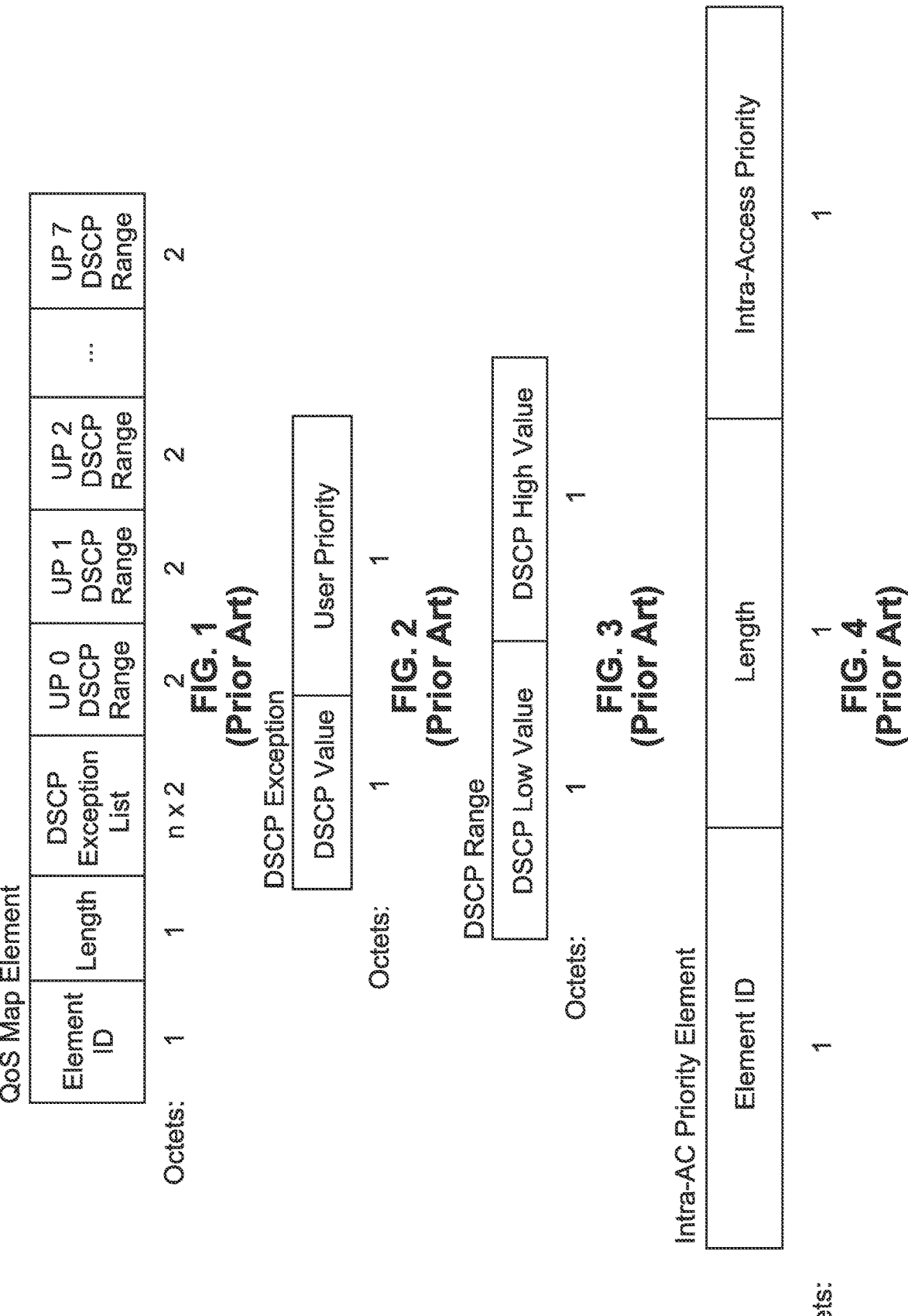
FIG. 1 is a data field diagram of an existing QoS Map element.
FIG. 2 is a data field diagram of an existing DSCP Exception element.
FIG. 3 is a data field diagram of an existing DSCP Range element.
FIG. 4 is a data field diagram of an existing Intra-AC Priority element.

Current IEEE 802.11 uses Differentiated Services Codepoint (DSCP) value of a MAC Service Data Unit (MSDU) or Aggregated-MSDU (A-MSDU) to classify the MSDU or A-MSDU into a User Priority (UP). For each UP, it has a TID with the same value as the UP. For example, UP 7 has TID 7 by default. An operation, such as a Block Ack (BA) operation, is based on each Traffic Identifier (TID) between the originator station (STA) and the recipient STA. It should be noted that when the BA of a TID is established, the originator STA is the STA which transmits a sequence of MSDUs and A-MSDUs of the TID and the recipient STA is the STA which sends BA to report receive status (i.e., whether a MSDU or A-MSDU of the TID is received successfully or not) within the sequence of MSDUs and A-MSDUs of the TID.

Current IEEE 802.11 be proposes to use a Stream Classification Service (SCS) procedure to differentiate a latency sensitive traffic stream from other traffic. When the SCS traffic stream is established successfully, the SCS traffic stream will be assigned by a TID and a UP, with the TID set to a value between 0 and 7; as seen in IEEE Draft P802.11 be D1.4.

1.2. TID in Draft P802.11 REVmd D5.0

The following information is summarized from the Draft specification Draft P802.11 REVmd D5.0. A traffic identifier (TID) is any of the identifiers usable by higher layer entities to distinguish Medium Access Control (MAC) Service Data Units (MSDUs) to MAC entities that support Quality of Service (QoS) within the MAC data service.

It should be noted that there are 16 possible TID values; 8 of which identify Traffic Categories (TCs), and the other 8 identify parameterized traffic streams (TSs). The TID is assigned to an MSDU in the layers above the MAC.

Priority parameter and TID subfield values 0 to 7 are interpreted as User Priorities (UPs) for the MSDUs. Outgoing MSDUs with UP values 0 to 7 are handled by MAC entities at STAs in accordance with the UP.

Priority parameter and TID subfield values 8 to 15 specify TIDs that are also TS identifiers (TSIDs) and select the TSPEC for the TS designated by the TID Outgoing MSDUs with priority parameter values 8 to 15 are handled by MAC entities at STAs in accordance with the UP value determined from the UP subfield as well as other parameter values in the selected TSPEC. When an MSDU arrives with a priority value between 8 and 15, and for which there is no TSPEC defined, then the MSDU shall be sent with priority parameter set to 0.

The received individually addressed frames at a QoS STA may be as follows: (a) Non-QoS subtypes, in which case the STA shall assign to them a priority of Contention. (b) QoS subtypes, in which case the STA shall infer the UP value from the TID in the QoS Control field directly for TID values between 0 and 7. For TID values between 8 and 15 the STA shall extract the UP value in the UP subfield of the TS Info field in the associated TSPEC, or from the UP field in the associated TCLAS (traffic classification) element, as applicable.

Table 1 depicts a User Priority to AC mapping for Draft P802.11 RECmd D 5.0, showing UPS from Lowest, at the top of the table, to the Highest, at the bottom of the table.

1.3. QoS Map Element in Draft P802.11 REVmd D5.0

Figure 9:
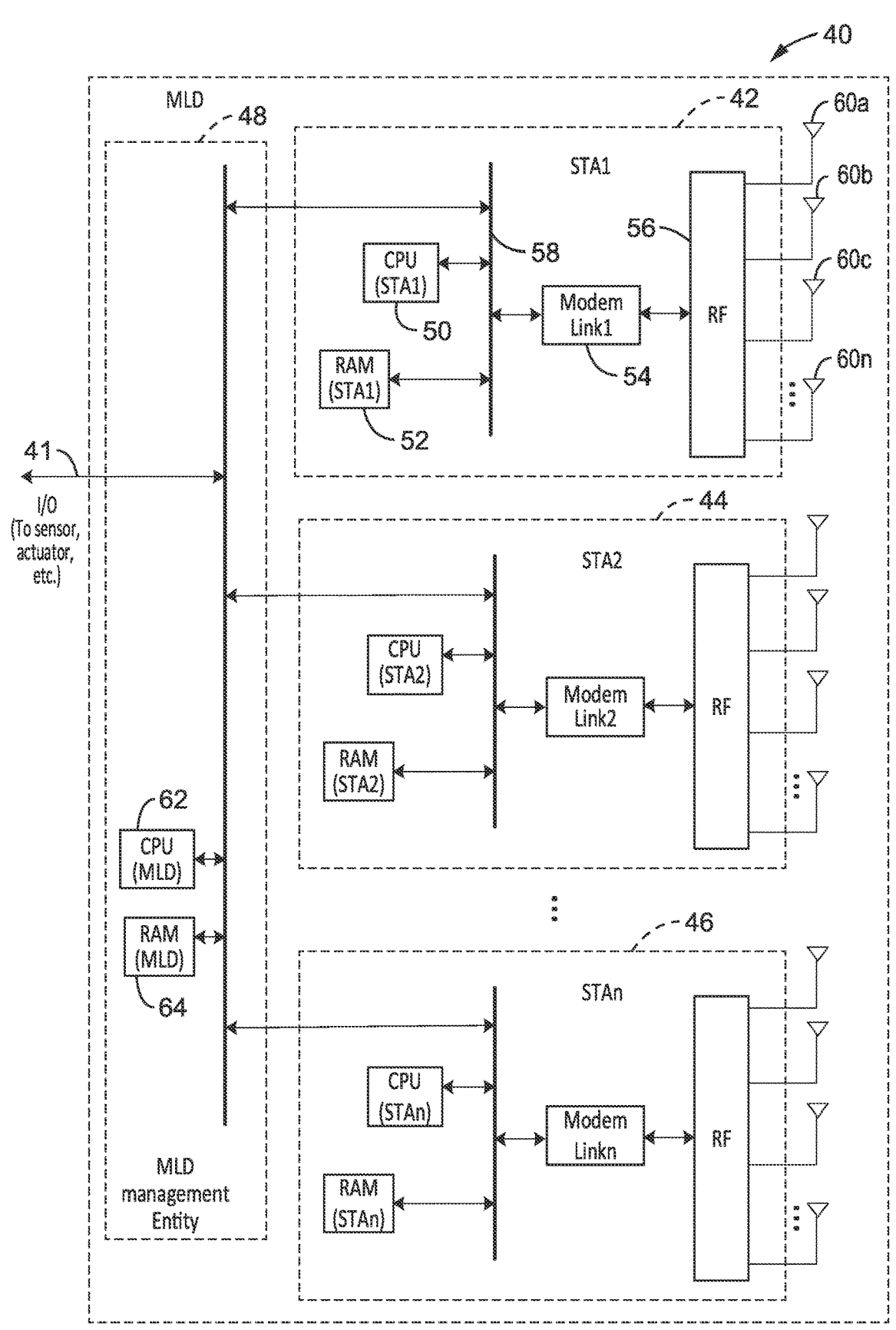
FIG. 9 is a block diagram Multi-Link Device (MLD) hardware according to at least one embodiment of the present disclosure.

FIG. 1, which was FIG. 9-489 of the Draft P802.11 REVmd D5.0, depicts that the QoS Map element is transmitted from an AP to a non-AP STA in an association (or reassociation) Response frame, or a QoS Map Configure frame, and provides the mapping of higher layer Quality-of-Service (QoS) constructs to User Priorities defined by transmission of Data frames in this standard. This element maps the higher layer priority from the DSCP field used with the Internet Protocol to User Priority as defined by this standard.

FIG. 2, which was FIG. 9-490 of the Draft Specification, is the DSCP Exception List field, which contains zero or more (n) DSCP Exception fields; with the maximum value of n being 21. The format of each DSCP Exception field is shown in FIG. 3.

The DSCP value in the DSCP Exception field is in the range of from 0 to 63, or 255, while the User Priority value is in the range of from 0 to 7.

When a non-AP STA begins transmission of a Data frame containing the Internet Protocol, it matches the DSCP field in the IP header to the corresponding DSCP value contained in this element. The non-AP STA first attempts to match the DSCP value to a DSCP exception field and uses the UP from the corresponding UP in the same DSCP exception field if successful, if no match is found then the non-AP STA attempts to match the DSCP field to a UP 'n' in the DSCP Range field, and uses the 'n' as the UP if successful, and otherwise uses a UP of 0. Each DSCP Exception field has a unique DSCP Value.

FIG. 3, which was FIG. 9-491 of the Draft Specification, depicts a DSCP Range description. The QoS Map element has a DSCP Range field corresponding to each of the 8 user priorities, whose range field is shown in the figure. The DSCP Range value is between 0 and 63, or 255.

The DSCP range for each user priority is nonoverlapping. The DSCP High Value is greater than or equal to the DSCP Low value. If the DSCP Range high value and low value are both equal to 255, then the corresponding UP is not used.

1.4. Intra-Access Priority in Draft P802.11 REVmd D5.0

FIG. 4, which FIG. 9-539 of Draft P802.11 REVmd D5.0, depicts an Intra Access-Category Priority element. The Intra-Access Category Priority element provides information from a non-AP STA to an AP on the relative priorities of streams within an AC, as described in Subclause 10.2.3.2 HCF contention based channel access (EDCA) in Draft P802.11 REVmd_D5.0 and Subclause 11.25.2 SCS procedures in Draft P802.11 REVmd_D5.0. This element is optionally present in ADDTS Request, QoS Map Configure, or SCS Request frames.

The Element ID and Length fields are defined in Subclause 9.4.2.1 General in Draft P802.11 REVmd_D5.0. The Intra-Access Priority field described below in FIG. 5.

FIG. 5, which is FIG. 9-540 of the Draft, depicts the format of the Intra-Access Priority field. The User Priority subfield indicates the UP of MSDUs Or A-MSDUs of the stream to which this Intra-Access Category Priority element relates.

The Alternate Queue subfield indicates the intended primary or alternate EDCA queue that is used for this stream. When dot11AlternateEDCA Activated is false, this subfield is reserved. When the Alternate Queue subfield is equal to 0, then the primary EDCA queue for this AC is used. When the Alternate Queue subfield is equal to 1, then the Alternate EDCA queue for this AC (see Draft Subclause 10.2.3.2 (HCF contention based channel access (EDCA))) is used.

The Drop Eligibility subfield is used to indicate the suitability of this TS to be discarded if there are insufficient resources. If there are insufficient resources, a STA should discard the MSDUS or A-MSDUs of a TS with a Drop Eligibility subfield equal to 1, in preference to MSDUs or A-MSDUs of a TS whose Drop Eligibility subfield is equal to 0. See Draft Subclause 11.24.2 (QMF policy advertisement and configuration procedures). The mechanisms for determining whether the resources are insufficient, or when to discard MSDUs or A-MSDUs are beyond the scope of this standard.

1.5. QoS Characteristics Element in Draft P802.11 be D1.4

FIG. 6, which is FIG. 9-1002ak in Draft P802.11 be D1.4, depicts a QoS Characteristics element. The QoS Characteristics element contains a set of parameters that define the characteristics and QoS expectations of a traffic flow, in the context of a particular non-AP EHT STA, for use by the EHT AP and the non-AP EHT STA in support of QoS traffic transfer using the procedures defined in Draft Subclause 11.25.2 (SCS procedures) and Draft Subclause 35.8 (Restricted TWT (r-TWT)).

Figure 7:
FIG. 7 is a data field diagram of an existing Control Information field.

FIG. 7, which is FIG. 9-1002al in the Draft, depicts the control information field seen in FIG. 6, having the following fields: Direction, TID, User Priority, Presence Bitmap of Additional Parameters, Link ID, and a reserved field.

2. Problem Statement

In prior 802.11 be protocols utilizing CSMA/CA contention and EDCA Access Category mechanisms, the TID and the UP with the same values between 0 and 7 are identical. The MSDU and A-MSDU, denoted as regular traffic, are classified by UP based on the DSCP value of the MSDU and A-MSDU. Each UP has the DSCP range and the MSDU or A-MSDU with the DSCP value within the DSCP range is classified as the traffic of that UP. Then, the TID of the regular traffic is the same as the UP. That is, the regular traffic is first differentiated by UP, then mapped to the TID with the same value of UP.

However, in IEEE 802.11 be, the SCS procedure allows mapping a SCS traffic stream, denoted as latency sensitive traffic, to a TID and a UP. The value of TID can be set to a value of from 0 to 7 only. For the latency sensitive traffic belonging to a SCS traffic stream, the TID of the SCS traffic is the TID of the latency sensitive traffic and the UP of the SCS traffic stream is the UP of the latency sensitive traffic. That is, the latency sensitive traffic is mapped to the UP and the TID at the same time. The present disclosure describes a new form of mapping between the UP and the TID which is different from the default mapping used by regular traffic; especially when the range of the UP and TID is between 0 and 7.

If the TID and the UP have to be set to the same value, then it is possible that latency sensitive traffic and regular traffic will share the same TID/UP. However, if the latency sensitive traffic and the regular traffic share the same TID/UP, then low latency performance can be adversely impacted.

3. Contribution of the Present Disclosure

By utilizing the disclosed technologies, a STA, such as STA1, can request to set TID-to-UP mapping on another STA, such as STA2, so that multiple TIDs can be mapped to the UPs of the same AC. Therefore, multiple (e.g., more than two) TIDs can be mapped to an AC.

By utilizing the disclosed technologies, a STA, denoted by STA1, can request to set TID-to-UP mapping on another STA, denoted by STA2, so that STA2 can use the TID-to-UP mapping to differentiate the MSDUs or A-MSDUs that are transmitted to STA1 in its buffer. The UP in the TID-to-UP mapping may not use its DSCP range to identify the MSDU or A-MSDU. In at least one embodiment, the DSCP range of the UP in the TID-to-UP mapping should be set to 0. In at least one embodiment, the DSCP range of the UP in the TID-to-UP mapping should be added to another UP not in the TID-to-UP mapping.

By utilizing the disclosed technologies, STA2 classifies the MSDU or A-MSDU by TID first, then uses the TID-to-UP mapping to map it to the corresponding UP. According to the current IEEE 802.11 protocol, the EDCAF of the AC that is mapped to the UP can be utilized for channel contention of the MSDU or A-MSDU. The transmit queue that is mapped to the UP can be used to enqueue the MSDU or A-MSDU.

By utilizing the disclosed technologies, STA1 and STA2 can establish a SCS traffic stream and assign a TID and a UP to that SCS traffic stream. In at least one embodiment/mode/option the value of the TID (0 through 7) and the UP must be the same.

In at least one embodiment/mode/option the TID and the UP have different values. For example, the value of TID is TIDx and the UP value is UPy for the SCS traffic stream. Then, the other SCS traffic streams between STA1 and STA2 with the same TID value equal to TIDx must be set to the value of the UP to UPy.

4. Embodiments of the Present Disclosure

4.1. Communication Station (STA and MLD) Hardware

Figure 8:
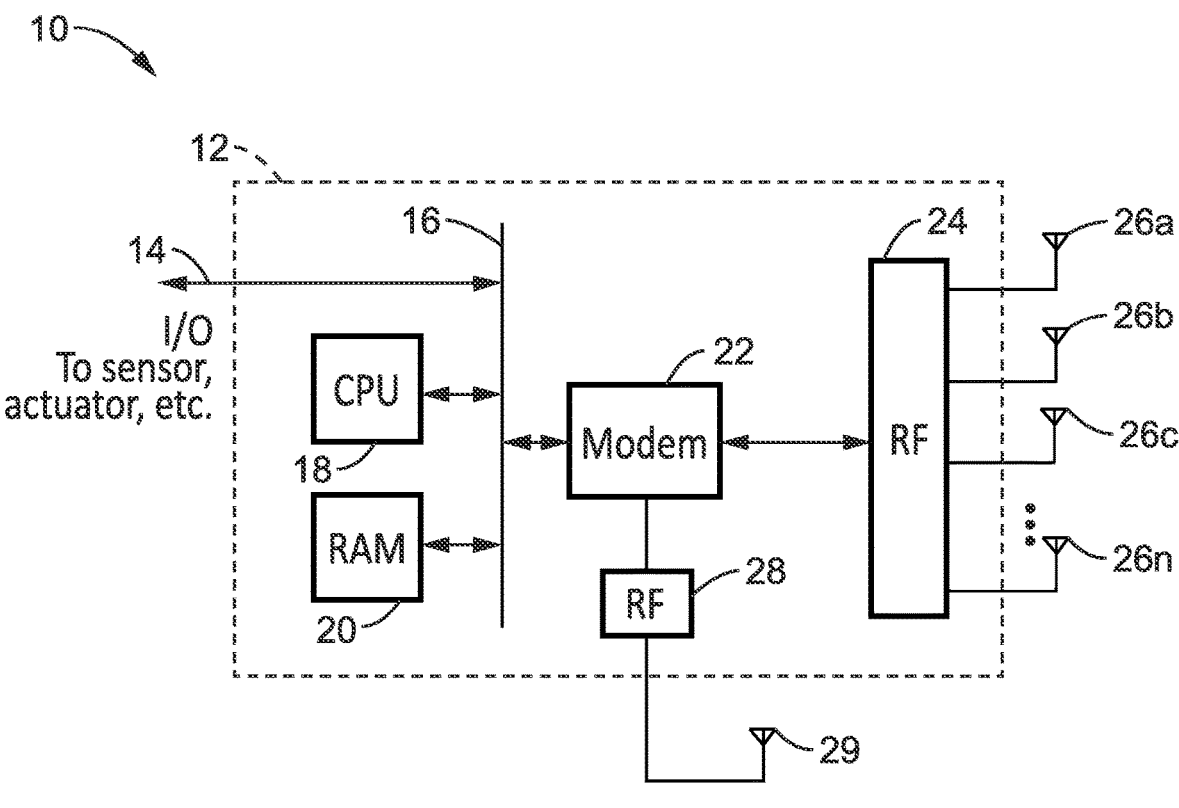
FIG. 8 is a block diagram of communication station hardware, according to at least one embodiment of the present disclosure.

FIG. 8 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an Access Point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a Multiple-Link Device (MLD), which typically will have a processor and memory for coordinating activity, although it should be appreciated that these resources may be shared as there is not always a need for a separate CPU and memory for each STA within the MLD.

FIG. 9 illustrates an example embodiment 40 of a Multi-Link Device (MLD) hardware configuration. Among multiple radios, basic link sets are the link pairs that satisfy Simultaneous Transmission and Reception (STR) mode.

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60*a*, 60*b*, 60*c* through 60*n*, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

5.0. TID to UP or AC Mapping

One object of the disclosed technology is to map multiple (more than two) TIDs to the same Access Category (AC). Meanwhile, each TID can be used by either regular traffic (i.e., Traffic Category (TC) having traffic that does not belong to any TS) only or to a traffic stream (TS), (e.g., SCS traffic stream or TS traffic stream) only.

Since the BA mechanism is TID based, the traffic stream is to be differentiated by TID. In at least one embodiment/mode/option multiple traffic streams with different QoS characteristics require the same AC priority. Then, one AC will be responsible for multiple traffic streams; that is to say that multiple TIDs are mapped to one Access Category (AC).

According to the current IEEE 802.11 standard, the TID between 0 and 7 is identical to a UP between 0 to 7, respectively. However, the current SCS operation allows setting TID values and UP values separately in the SCS setup procedure. This allows that a TID of from 0 to 15 can be mapped to UP values of from 0 to 7. When a TID value from 8 to 15 is mapped to a UP, it can follow the current rules as defined in TS operation of IEEE 802.11, which does not specify how a TID from 0 to 7 is mapped to a UP with different value.

Also, even if one TID of the SCS traffic stream(s) is mapped to the UP with the same value, then in at least one embodiment/mode/option the TID may only be used by the SCS traffic stream(s), but not for regular traffic which is not associated with the SCS traffic streams.

In the disclosed technology, multiple (two or more) TIDs with values between 0 and 7 can be mapped to the same UP while the UP can be mapped to an AC.

Option 1: if a TID with a value between 0 and 7, denoted by TIDx, is mapped to a UP with a different value, denoted by UPy, then UPx (the UP with the same value of TIDx) may not be used to differentiate MSDU or A-MSDU by the DSCP range of UPx.

Option 2: if a TID with a value between 0 and 7, denoted by TIDx, is mapped to a UP with a different value, denoted by UPy, then the regular traffic of UPx is mapped to another TIDz.

It should be noted that the TID-to-UP mapping can be per <transmitter STA/MLD, receiver STA/MLD>tuple or per pair of STAs/MLDs.

5.1. STA Mapping a TID to a UP (Option 1)

Figure 10:
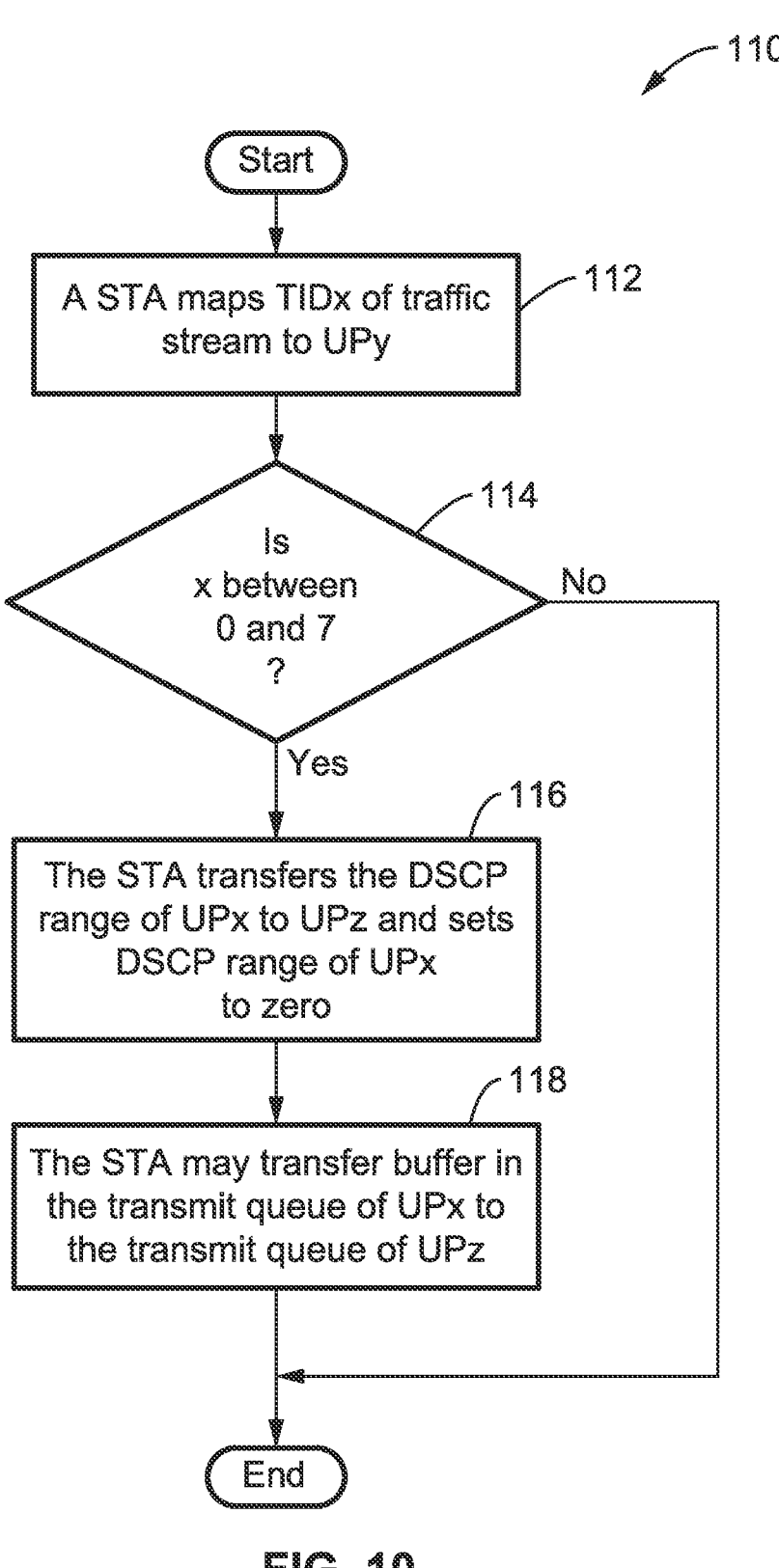
FIG. 10 is a flow diagram of STA mapping of a TID to a UP (option 1) according to at least one embodiment of the present disclosure.

FIG. 10 illustrates an example embodiment 110 of mapping a TID of a traffic stream (or a TID will be used for traffic stream) to a UP. It should be noted that when a TID, e.g., TIDx, between 0 and 7 is not used by a traffic stream, then it is identical to the UP with the same value, i.e., UPx. The DSCP range of UPx is not zero.

When a STA maps 112 a TID, for example TIDx, of traffic streams (such as SCS traffic stream or TS traffic stream) to a UP, in this example UPy, in its transmit buffer, then the following is performed. At check 114 it is determined if TIDx is between 0 and 7. If the condition is not met, then the process ends and the STA maps TIDx to UPy according to the current IEEE 802.11 rule. Otherwise, the STA transfers 116 the DSCP range of UPx to UPz and sets the DSCP range of UPx to zero. For example, the DSCP range of UPx can set its DSCP range high value and DSCP range low value to 255. The STA may transfer 118 the buffer of UPx to the transmit queue of UPz whose DSCP range is not zero. In at least one embodiment/mode/option x=y or x≠y.

It should be noted that when the DSCP range of UPy is not zero, it is identical to TIDy by default according to the current IEEE 802.11.

In at least one mode/embodiment/option if a TIDx of a traffic stream is mapped to UPx, then the DSCP range of UPx does not change. The MSDU or A-MSDU whose DSCP value is within the DSCP range of UPx can still be mapped to UPx and TIDx.

In at least one embodiment/mode/option at least one of the UPs of the same AC can still use the DSCP range to classify the MSDU or A-MSDU. That is, the DSCP range of that UP is not zero. In at least one embodiment/mode/option UPx and UPz must be mapped to the same AC. In at least one embodiment/mode/option UPz must have lower priority than UPx. In at least one embodiment/mode/option the TID-to-UP mapping has to be performed during the association or reassociation procedure. In at least one embodiment/mode/option more than one TID is mapped to the same UP.

5.2. STA Classifying MSDU or A-MSDU

Figure 11:
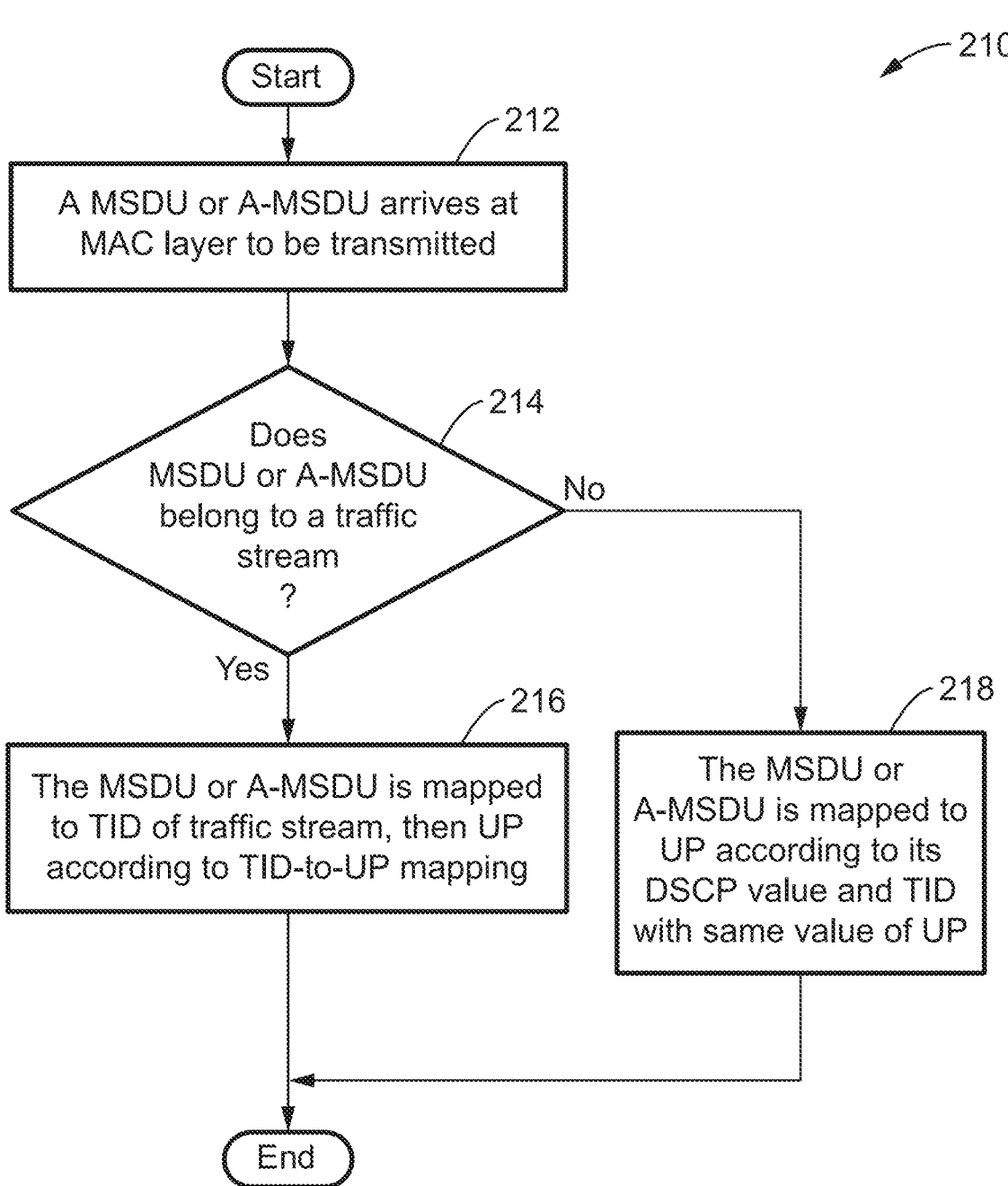
FIG. 11 is a flow diagram of a STA classifying MSDU or A-MSDU by TID and UP, performed according to at least one embodiment of the present disclosure.

FIG. 11 illustrates an example embodiment 210 of a STA classifying MSDU or A-MSDU by TID and UP. When a MSDU or A-MSDU arrives 212 at the MAC layer, the STA needs to classify the MSDU or A-MSDU for transmission.

At check 214, it is determined if the MSDU or A-MSDU belongs to a traffic stream (such as SCS traffic stream, TS traffic stream). If the condition is met, then the MSDU or A-MSDU is mapped 216 to the TID of the traffic stream; and the STA determines the UP of the MSDU or A-MSDU according to the TID-to-UP mapping, and the process ends.

Otherwise, if the condition of check 214 is not met, then the MSDU or A-MSDU is mapped 218 to a UP according to the DSCP value of the MSDU or A-MSDU. The MSDU or A-MSDU belongs to a UP whose DSCP range includes the DSCP value of the MSDU or A-MSDU. Then, the MSDU or A-MSDU belongs to the TID which has the same value as the UP that the MSDU or A-MSDU belongs to. The process then ends.

5.3. TID to UP Mapping Request and Response Frames

Figures 12, 13:
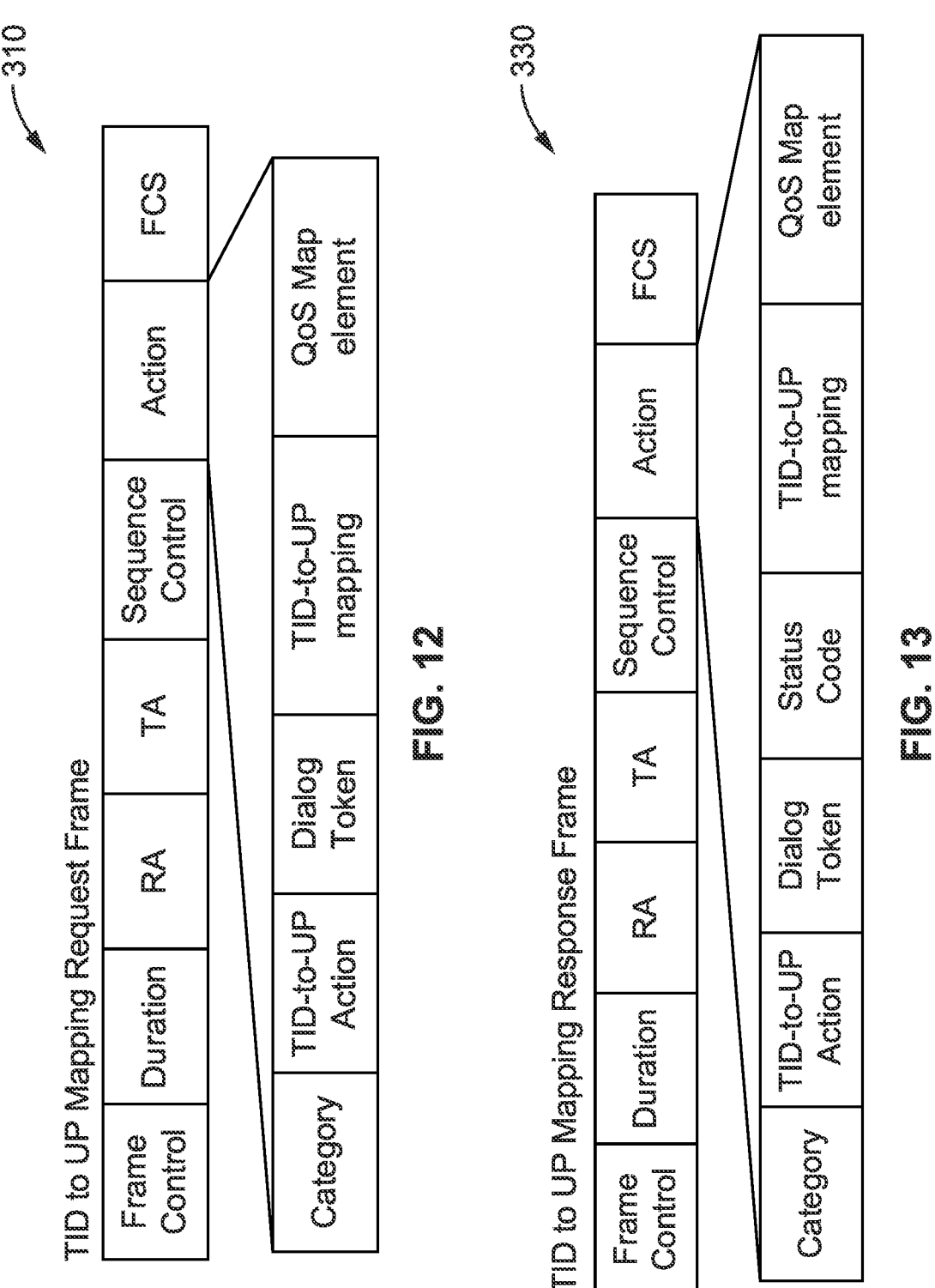
FIG. 12 is a data field diagram of a TID-to-UP Mapping Request frame according to at least one embodiment of the present disclosure.
FIG. 13 is a data field diagram of a TID-to-UP Mapping Response frame according to at least one embodiment of the present disclosure.

FIG. 12 illustrates an example embodiment 310 of a TID to UP mapping request frame.

A Frame Control field indicates the type of frame, which can be used to indicate it is an action frame. A Duration field contains NAV information used for Carrier Sense Multiple Access/Collision Avoidance (CSMA/CA) channel access. A Receiver Address (RA) field contains an address for the recipient of the frame. A Transmitter Address (TA) field contains the address of the STA that transmitted the frame. A Sequence control field contains the fragment number and the sequence number of the frame.

Figures 14, 15:
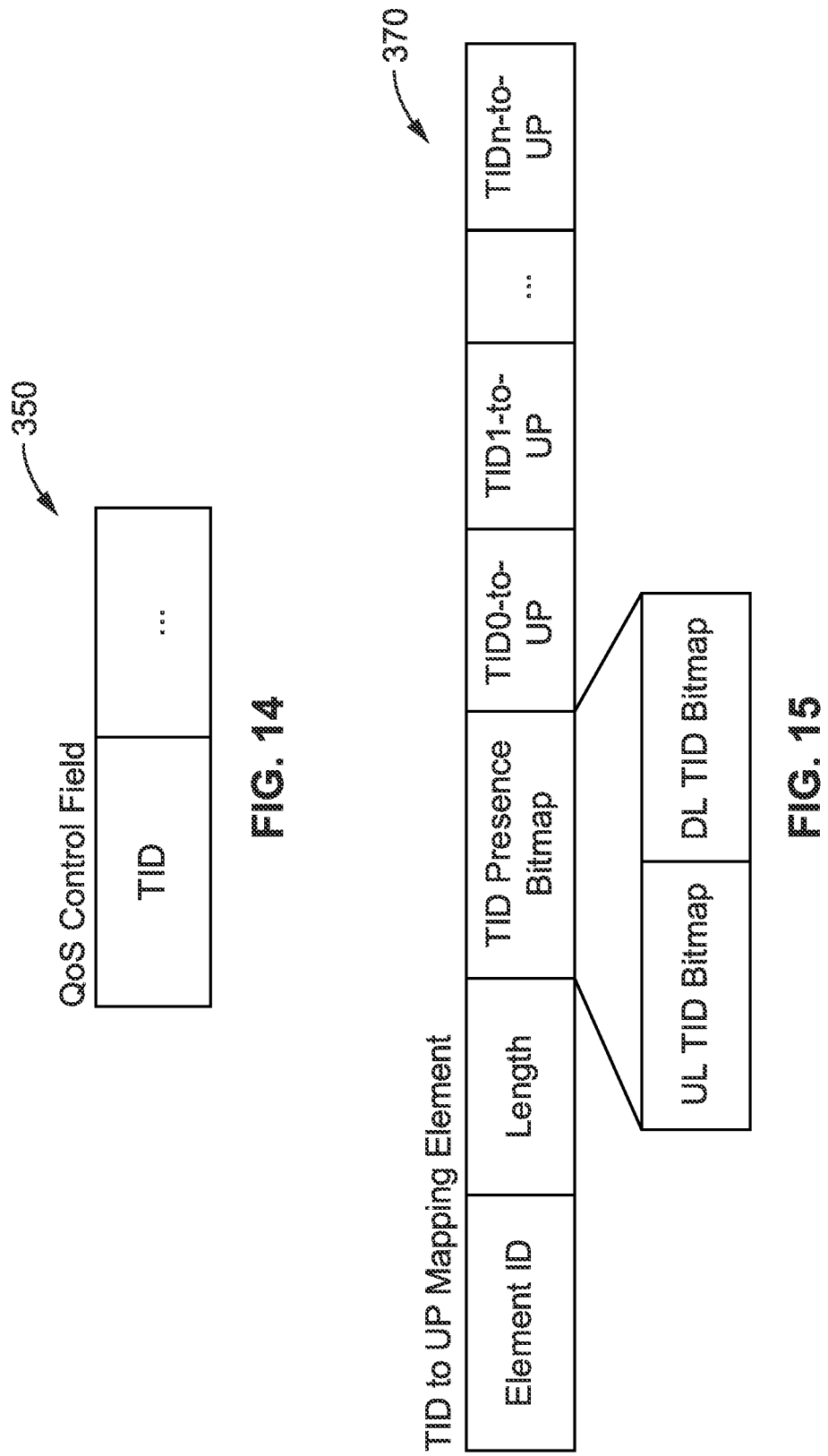
FIG. 14 is a data field diagram of a QoS control field according to at least one embodiment of the present disclosure.
FIG. 15 is a data field diagram of a TID-to-UP Mapping element according to at least one embodiment of the present disclosure.
Figure 20:
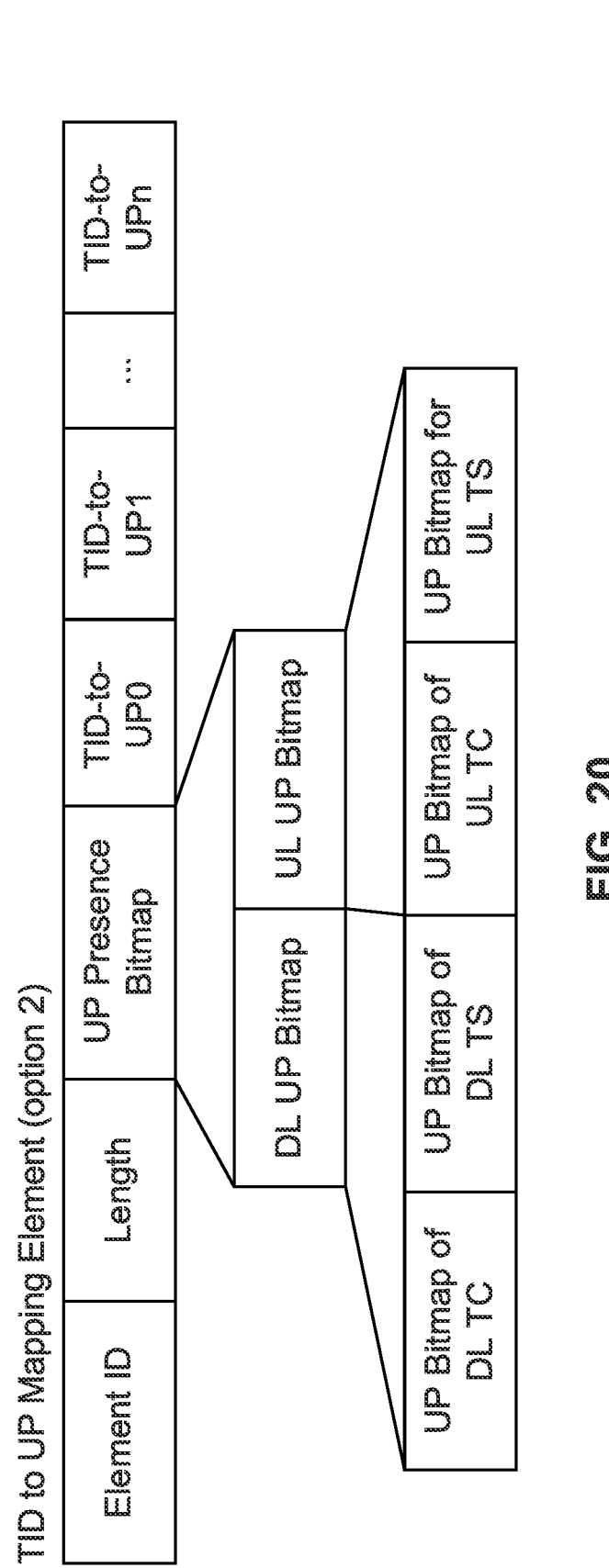
FIG. 20 is a data field diagram of TID-to-UP Mapping element (option 2) according to at least one embodiment of the present disclosure.

In the Action field, is shown numerous subfields as follows. Category and TID-to-UP Action subfields indicate it is a TID-to-UP mapping request frame. A Dialog token is set to identify the TID-to-UP mapping request frame. A TID-to-UP mapping subfield provides the mapping, with the format of TID-to-UP mapping as shown in FIG. 15 or FIG. 20. The STA sets this field to indicate its request of the recipient of this frame using the TID-to-UP mapping for the MSDUs or A-MSDUs of traffic streams that are transmitted to the STA.

A QoS map element may utilize the format shown in Table 1. The STA sets this field to indicate its request of the recipient of this frame using the QoS Map for the MSDUs or A-MSDUs that are transmitted to the STA but which do not belong to traffic streams.

It should be noted that if TIDx is set in TID-to-UP mapping, then the DSCP range of UPx in QoS map element should be set to 0. It can be an exception when TIDx is mapped to UPx in TID-to-UP mapping.

The recipient of this frame should use the TID-to-UP mapping and QoS Map element to classify the MSDUs and A-MSDUs by TID and UP if it accepts the request.

FIG. 13 illustrates an example embodiment 330 of a TID to UP mapping response frame.

A Frame Control field indicates the type of frame, which can be used to indicate it is an action frame. A Duration field contains NAV information used for CSMA/CA channel access. An RA field contains an address for the recipient of the frame. A TA field contains the address of the STA that transmitted the frame. A Sequence control field contains the fragment number and the sequence number of the frame.

An Action field is shown further divided into the following subfields. A Category and TID-to-UP Action subfields indicate it is a TID-to-UP mapping response frame. A Dialog token should be set to the same value of that in the corresponding TID-to-UP mapping request frame. A Status Code field can be set which is the same, or similarly defines, as in IEEE 802.11. When the Status Code is set to accept, then the STA which is sending this response frame will use the TID-to-UP mapping and QoS map as indicated in the response frame (or the TID-to-UP mapping and QoS map as indicated in the request frame if they are not present in the response frame) to classify the MSDUs or A-MSDUs of the recipient of the response frame by TID and UP.

When the Status Code is set to a value indicating 'rejection', then the STA sending this response frame rejects the request. When the Status Code is set to value indicating to reject with recommended parameters, then the STA which is sending this response frame rejects the request. The STA which is sending this response frame sets the TID-to-UP mapping and QoS map element in the response frame and the recipient of this frame can use the parameters in the TID-to-UP mapping and QoS map element to again request TID-to-UP mapping.

A TID-to-UP mapping subfield can use the format of TID-to-UP mapping as shown in FIG. FIG. 15 or FIG. 20. If the STA accepts the request, it sets this field to the TID-to-UP mapping it will use for the MSDUs or A-MSDUs of traffic streams that are transmitted to the recipient of the response frame. In at least one embodiment/mode/option this field is not present if this field is set to be the same as that in the corresponding request frame. If the STA rejects the request, this field may not be present in the response frame. If the STA rejects the request, but includes recommendation parameters, then the STA sending this response frame sets the TID-to-UP mapping in the response frame and the recipient of this frame can use the parameters in the TID-to-UP mapping to request TID-to-UP mapping again.

A QoS map element indicates the mapping and may use the format as shown in Table 1. If the STA accepts the request, it sets this field to the QoS map it will use for the MSDUs or A-MSDUs of non-traffic streams that are transmitted to the recipient of the response frame. In at least one embodiment/mode/option this field is not present if this field is set to be the same as that in the corresponding request frame. If the STA rejects the request, this field may not be present in the response frame. If a STA rejects the request but includes recommendation parameters, then the STA which is sending this response frame sets the QoS map in the response frame and the recipient of this frame can use parameters in the QoS map to subsequently request TID-to-UP mapping.

FIG. 14 illustrates an example embodiment 350 of a QoS Control Field. In the current IEEE 802.11 protocol, the TID subfield in the QoS control field is set to the UP for either TC (or regular traffic) or TS (e.g., TS traffic stream or SCS traffic stream), regardless of whether admission control is required, when the access policy is EDCA.

When TID-to-UP mapping is utilized, then in at least one embodiment/mode/option this TID subfield is set to the TID for either TC or TS instead.

FIG. 15 illustrates an example embodiment 370 of a TID-to-UP Mapping Element (Option 1), whose fields are described as follows.

An Element ID field is set to indicate this is a TID-to-UP mapping element. A Length field is set to indicate the length of the TID-to-UP mapping element. A TID Presence Bitmap field is a sequence of bits with each bit representing a TID. When a bit is set to a first state (e.g., "1"), then the corresponding TID-to-UP field is used or present in the element. When a bit is set to a second state (e.g., "0"), then the corresponding TID-to-UP field is reserved or not present in the element. It should be noted that if there are n+1 TIDs (TID0 through TIDn), then this field has n+1 bits. This field can include the TIDs for DL and UL. That is, this field can have 8 bits for DL TIDs and another 8 bits for UL TIDs.

The TIDx-to-UP field (depicted with TID0-to-UP, TID-to-UP, through to TIDn-to-UP fields) is set to a UP value that TIDx is mapped to.

In at least one embodiment/mode/option this element is carried by the management frames, such as an association (or reassociation) request frame to set TID-to-UP mapping at the recipient of the frames.

In at least one embodiment/mode/option this element is carried by the management frames, such as a beacon or an association/reassociation response frame to set TID-to-UP mapping at the recipient of the frames.

6.0. Example Relating to TID to UP Mapping

6.1. TID to UP Mapping (Option 1)—Example 1

Figure 16:
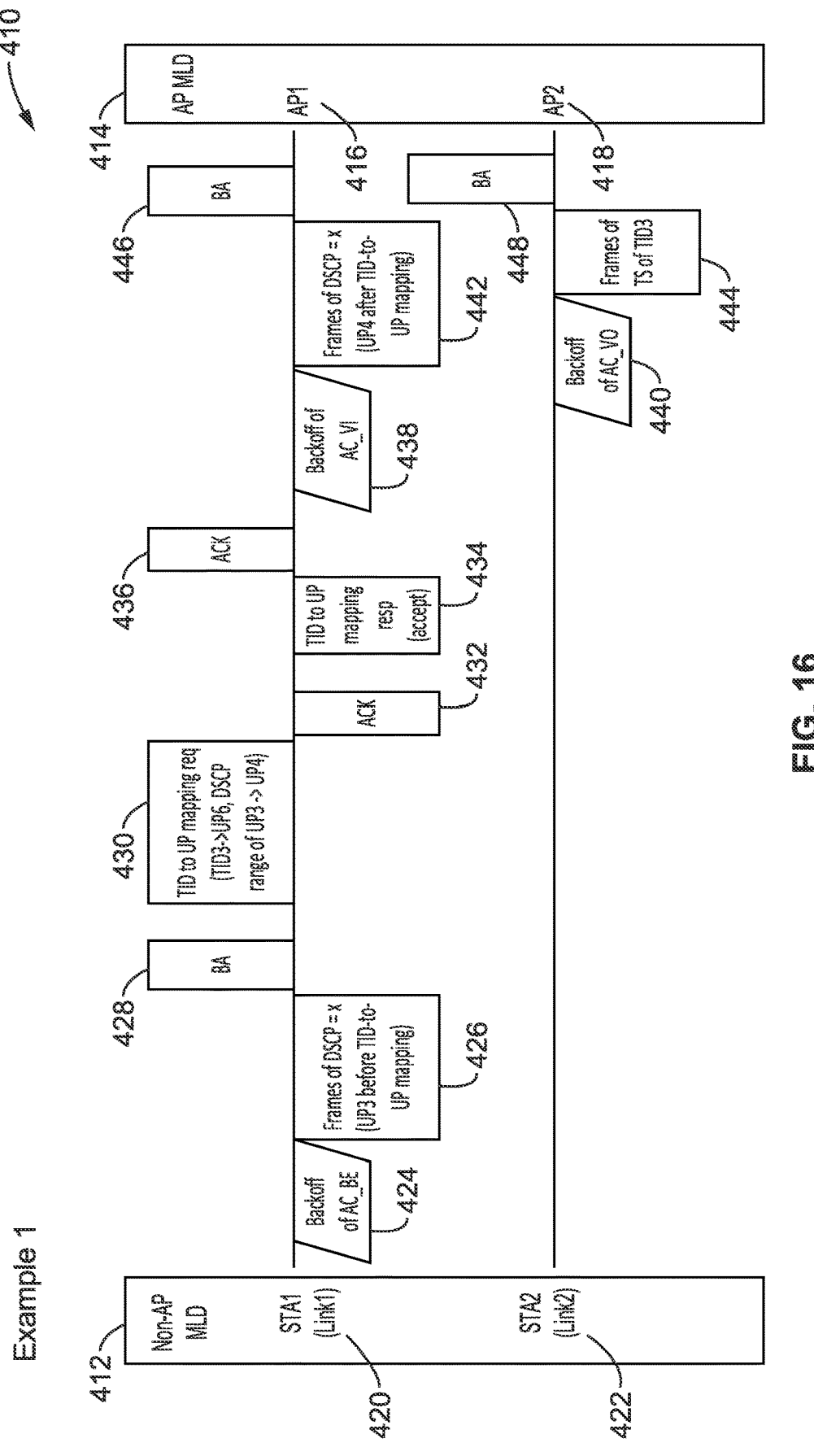
FIG. 16 is a communications diagram of TID-to-UP mapping (option 1) according to at least one embodiment of the present disclosure.

FIG. 16 illustrates an example embodiment 410 as Example 1, of TID to UP mapping with Option 1. It is assumed in this example that the TID-to-UP mapping is for a DL. Communications are depicted between a non-AP MLD 412 with STA1 420 and STA2 422; and an AP MLD 414 with AP1 416 and AP2 418.

Before the non-AP MLD sends a TID-to-UP mapping request to the AP MLD, the AP MLD uses default settings to classify MSDUs and A-MSDUs that are transmitted to the non-AP MLD by TID and UP. As shown in the figure, the frames of DSCP=x within the DSCP range of UP3 is classified as the frames of UP3.

AP1 performs backoff 424 of AC_BE (the AC of UP3) to contend for the channel, and upon obtaining the channel it transmits the frames 426 of DSCP=x to STA1, which is received and acknowledged with a Block Ack (BA) 428 by STA1.

Then, STA1 sends a TID-to-UP mapping request 430 frame to AP1. In the frame, STA1 requests to map TID3 to UP6 and the DSCP range of UP3 will be transferred to UP4. That is, the DSCP range of UP4 after TID-to-UP mapping is equal to the DSCP range of UP4 before TID-to-UP mapping plus the DSCP range of UP3 before TID-to-UP mapping.

AP1 Acks 432 the request and determines if it will be accepted. In this example, AP1 accepts the request sending a TID to UP mapping response 434, with the frames of the traffic streams of TID3 that are transmitted to the non-AP MLD will be enqueued in the transmit queue of UP6 at AP MLD.

At the AP MLD, AP2 performs backoff 440 of AC_VO (the AC of UP6) to contend for the channel to transmit the frame of the traffic streams 444 of TID3 to STA2, and receives BA 448.

Meanwhile, the frames of DSCP=x that do not belong to any traffic streams will be mapped to UP4 after the TID-to-UP mapping. The AP MLD, e.g., AP1, uses backoff 438 of AC_VI (the AC of UP4) to contend for the channel to transmit the frames 442 of DSCP=x to STA1. The frames of DSCP=x now is the traffic of TID4. The frames are received, and BA 446 received from STA1.

6.2. SCS Setup According to TID to UP Mapping—Example 2

Figure 17:
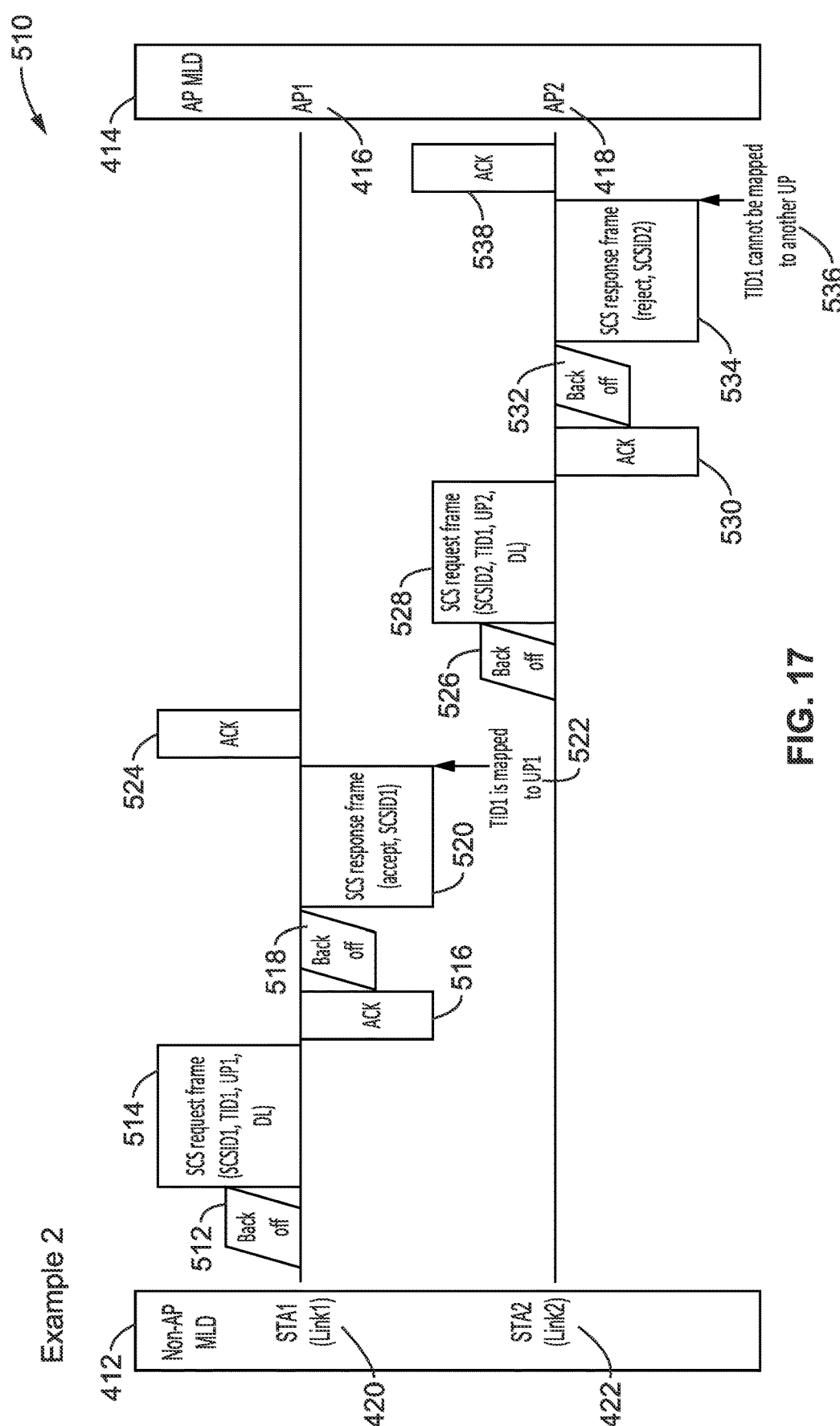
FIG. 17 is a communications diagram of SCS setup according to TID-to-UP mapping performed according to at least one embodiment of the present disclosure.

FIG. 17 illustrates an example embodiment 510 of establishing an SCS traffic stream according to TID-to-UP mapping. The purpose of this example is to show that the TID and UP of a traffic stream should not conflict with the existing TID-to-UP mapping. In at least one embodiment/mode/option the TID-to-UP mapping is set by the SCS setup. For the sake simplifying the example, it is assumed that the TID-to-UP mapping is for DL, and that no TID-to-UP mapping has been established prior to the SCSID1 traffic stream setup; although the present disclosure is not limited in regard to prior mappings.

As in the prior figure, communications are depicted between a non-AP MLD 412 with STA1 420 and STA2 422; and an AP MLD 414 with AP1 416 and AP2 418.

After backoff 512, STA1 obtains the channel and sends a SCS request frame 514 to establish downlink (DL) SCSID1 traffic stream between the non-AP MLD and the AP MLD. The TID and UP of SCSID1 traffic stream is TID1 and UP1. AP1 Acks 516 receipt of the request, and performs backoff 518, followed by an SCS response frame 520 indicating acceptance of the request and the SCSID1 traffic stream is established successfully. Since there was no prior TID-to-UP mapping, the AP MLD maps TID1 to UP1; that is to say that the traffic streams of TID1 has to be mapped 522 to UP1. STA1 acknowledges 524 receipt of the SCS response frame.

STA2 is seen contending 526 for and obtaining the channel to send another SCS request frame 528 to establish DL SCSID2 traffic stream between the non-AP MLD and the AP MLD. AP2 Acks receipt 530.

However, in this example AP2 decides to reject the request since the TID and UP of SCSID2 traffic stream is TID1 and UP2, which conflicts with the TID-to-UP mapping that was setup during the SCSID1 setup procedure. AP1 sends an SCS response frame 534 indicating the rejection, indicating that TID1 cannot be mapped 536 to another UP. STA2 Acks 538 the SCS response frame.

It should be noted that since TID1 of the traffic stream is mapped to UP1, then UP1 can still use its DSCP range to classify the MSDUs and A-MSDUs that do not belong to any traffic streams.

6.3. Set TID to UP Mapping During Association—Example 3

Figure 18:
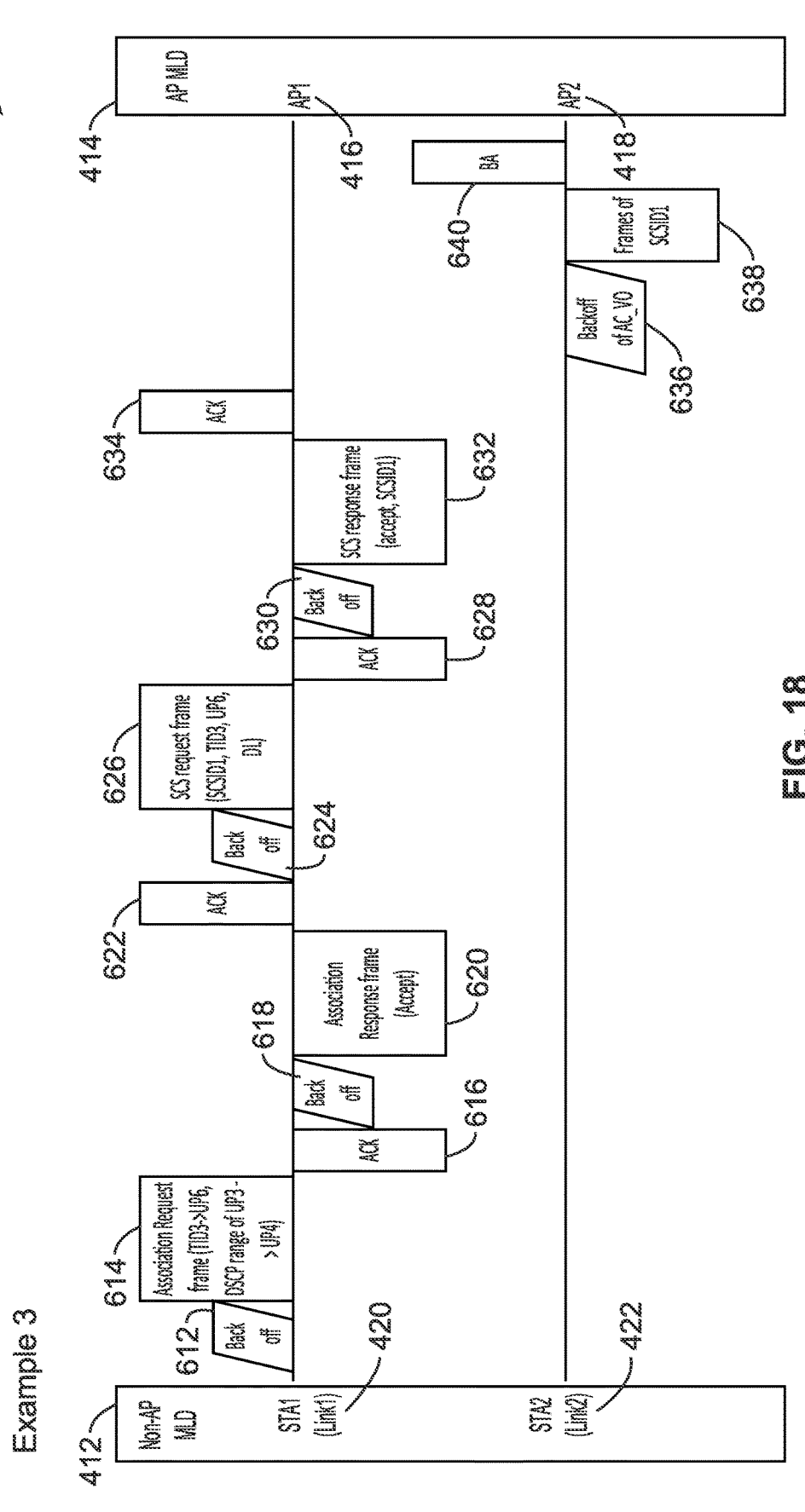
FIG. 18 is a communications diagram of setting TID-to-UP mapping during an association according to at least one embodiment of the present disclosure.

FIG. 18 illustrates an example embodiment 610 of setting TID to UP mapping during an association procedure. In this example it is assumed that the TID-to-UP mapping is for DL.

As in the prior figure, communications are depicted between a non-AP MLD 412 with STA1 420 and STA2 422; and an AP MLD 414 with AP1 416 and AP2 418.

STA1 performs a backoff 612, obtains the channel and sends an association request 614 frame, which includes the TID-to-UP mapping element and QoS map element in the association request frame, to AP1 which Acks 616 its receipt. In the request STA1 has requested to map TID3 to UP6 for the traffic stream and transfer the DSCP range of UP3 to UP4 for those frames not belonging to any traffic stream.

AP1 decides to accept the request and performs backoff 618 and after obtaining the channel it transmits an association response frame 620 indicating acceptance, and the AP MLD afterward starts using the TID-to-UP mapping element and QoS map to classify the MSDUs and A-MSDUs that are transmitted to the non-AP MLD by TID and UP. STA1 Acks receipt 622 of the acceptance.

Then, after backoff 624 and obtaining the channel, the non-AP STA (STA1) sets up a DL SCSID1 SCS traffic stream 626 with the AP MLD. The non-AP STA should set the TID to TID3 and the UP to UP6 of SCSID1 traffic stream to match the existing TID-to-UP mapping. AP1 Acks 628 receipt of the request frame.

After the SCSID1 traffic stream is established successfully, AP MLD is seen using backoff 630 of AC_VO (the AC of UP6) to contend for the channel to transmit the frames of SCSID1 632, in which the TID of the frames of SCSID1 is TID3, to the non-AP MLD.

STA2 performs a backoff of AC_VO 636 and sends frames of SCSID1 638. AP2 receives and Acks 640 the frames.

6.4. STA Mapping a TID to a UP (Option 2)

Figure 19:
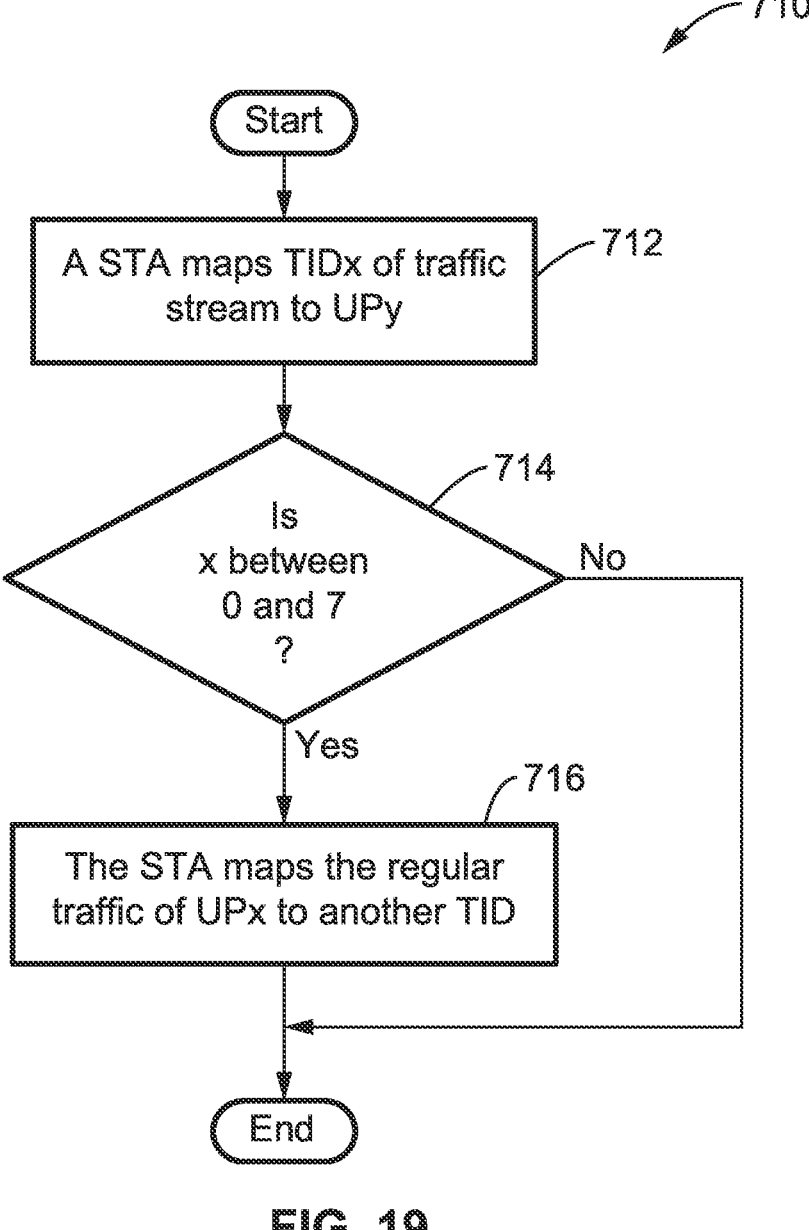
FIG. 19 is a flow diagram of a STA mapping a TID to a UP (option 2) according to at least one embodiment of the present disclosure.

FIG. 19 illustrates an example embodiment 710 of an alternative option of mapping a TID of a traffic stream (or a TID that will be used for a traffic stream) to a UP. Compared with option 1, this flowchart shows that the range of DSCP of the UP does not change, and can still be used for regular traffic with another TID.

When a STA maps 712 a TID, e.g., TIDx, of traffic streams (such as SCS traffic stream or TS traffic stream) to a UP, such as UPy, in its transmit buffer, then the following takes place.

Check 714 determines if TIDx is between 0 and 7. If the condition is not met, then the process ends with the STA mapping TIDx to UPy according to the current IEEE 802.11 rule. If the condition is met, then the STA maps 716 the regular traffic of UPx to another TID. For example, when a SCS traffic stream uses TID3 and UP6, then, the regular traffic of UP3 is mapped to TID0. The regular traffic of UP3 and UP0 share the same TID0.

In at least one embodiment/mode/option x=y or x≠y. In at least one embodiment/mode/option one TID is mapped to multiple UPs. The multiple UPs using the same TID may have to use the same AC. In at least one embodiment/mode/option each UP has to be mapped to a TID for its regular traffic. In at least one embodiment/mode/option each TID can be used for either regular traffic or traffic stream. In at least one embodiment/mode/option such TID-to-UP mapping has to be performed during the association/reassociation procedure. In at least one embodiment/mode/option more than one TID are mapped to the same UP.

FIG. 20 illustrates an example embodiment 750 of a TID to UP Mapping element according to Option 2, which is an alternative of FIG. 15.

An Element ID field is set to indicate that this is a TID-to-UP mapping element. A Length field is set to indicate the length of the TID-to-UP mapping element. A UP Presence Bitmap field contains a sequence of bits and each bit represents a UP with specified traffic. When a bit is set to a first state (e.g., "1"), then the corresponding TID-to-UP field is used, or is present, in the element. When a bit is set to a second state (e.g., "0"), then the corresponding TID-to-UP field is reserved or not present in the element.

A UP Bitmap of DL TC represents the UPs for the downlink regular traffic. A UP Bitmap of UL TC represents the UPs for the uplink regular traffic. A UP Bitmap of DL TS represents the UPs for the downlink traffic stream. A UP Bitmap of UL TS represents the UPs for the uplink traffic stream.

TID-to-UPx field (depicted with TID0-to-UP, TID-to-UP, through to TIDn-to-UP fields) is set to a TID that is mapped to UPx.

In at least one embodiment/mode/option this element is carried by the management frames, such as an association/reassociation request frame, to set TID-to-UP mapping at the recipient of the frames. In at least one embodiment/mode/option this element is carried by the management frames, such as a beacon or an association/reassociation response frame, to set TID-to-UP mapping at the recipient of the frames.

6.5. TID to UP Mapping Using Option 2—Example 4

Figure 21:
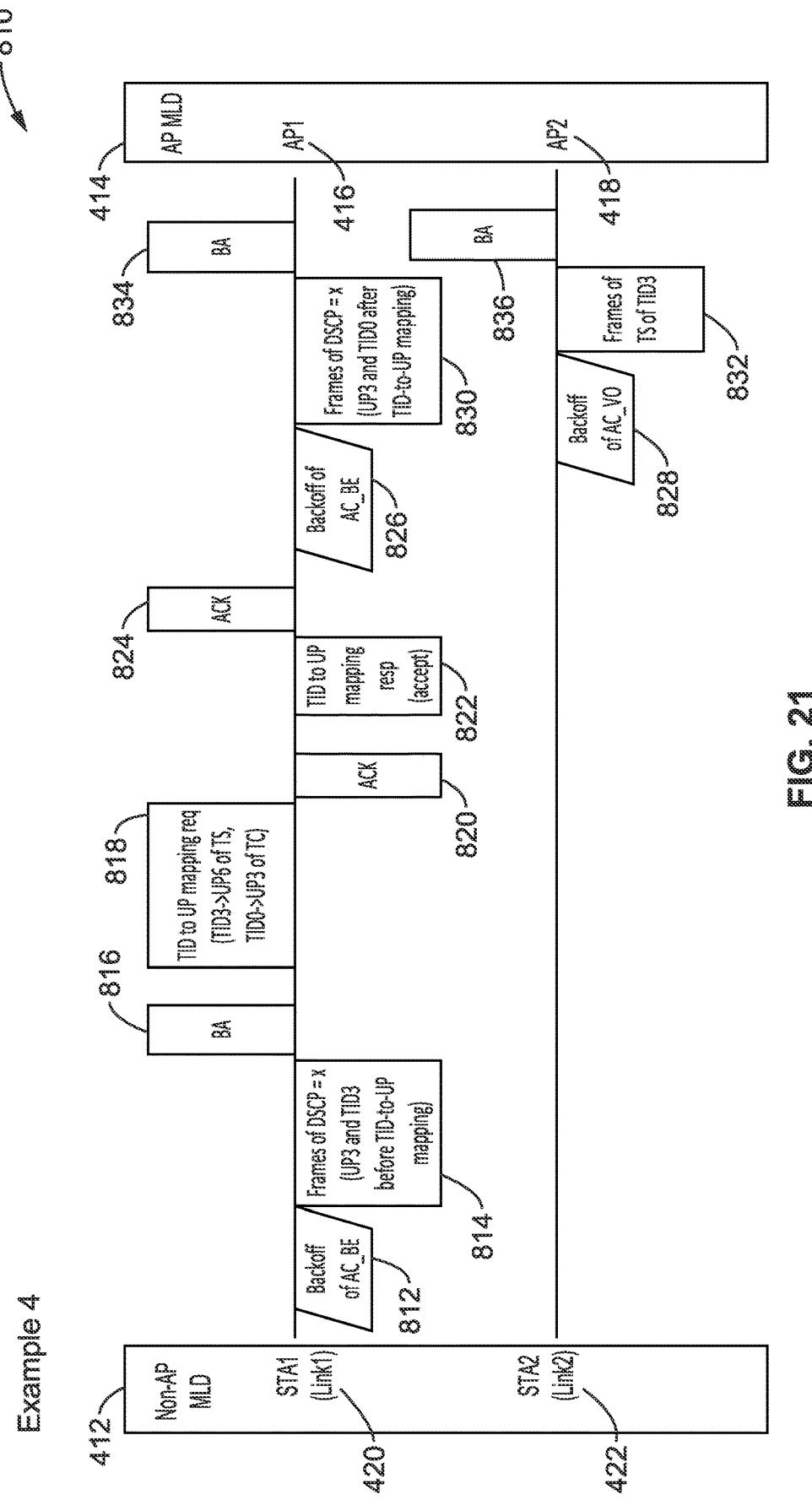
FIG. 21 is a communications diagram of TID-to-UP mapping using option 2 according to at least one embodiment of the present disclosure.

FIG. 21 illustrates an example embodiment 810 of TID to UP Mapping using Option 2; in which it is assumed that the TID-to-UP mapping in the example is for DL.

As in FIG. 18, communications are depicted between a non-AP MLD 412 with STA1 420 and STA2 422; and an AP MLD 414 with AP1 416 and AP2 418.

Before the non-AP MLD sends a TID-to-UP mapping request to the AP MLD, the AP MLD uses default settings to classify MSDUs and A-MSDUs that are transmitted to the non-AP MLD by TID and UP.

As shown in the figure the frames of DSCP=x within the DSCP range of UP3 is classified as the frames of UP3. AP1 performs a backoff 812 of AC_BE (the AC of UP3) to contend for the channel to transmit the frames 814 of DSSP=x to STA1, which acknowledges receipt with BA 816.

Then, STA1 sends a TID-to-UP mapping request frame 818 to AP1. In the frame, STA requests to map TID3 to UP6 of TS and TID0 to UP3 of TC. That is, the traffic stream of UP6 is to use TID3, and the regular traffic of UP3 is to use TID0.

AP Acks 820 receipt of the frame, and determines to accept the request by sending a TID to UP mapping response 822, which indicates acceptance. STA1 Acks 824 receipt of the acceptance.

After AP1 accepts the request, the frames of the traffic streams of TID3 that are transmitted the non-AP MLD will be enqueued in the transmit queue of UP6 at AP MLD.

AP2 of the AP MLD is seen performing a backoff 828 of AC_VO (the AC of UP6) to contend for the channel, and upon obtaining the channel it transmits the frame 832 of the traffic streams of TID3 to STA2, which Acks receipt by sending BA 836.

Meanwhile, the frames of DSCP equal to x that belongs to regular traffic will be mapped to UP3, but will utilize TID0 after the TID-to-UP mapping. In the example, AP1 of the AP MLD, still uses a backoff of AC_BE (the AC of UP3) to contend 826 for the channel to transmit the frames 830 of DSCP=x to STA1. However, the SN of the frames of DSCP=x should be set to the SN of TID0. STA1 acknowledges receipt with BA 834.

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an access point (AP) STA, for wirelessly communicating with other wireless stations (STAs) using carrier sense multiple access/collision avoidance (CSMA/CA) and enhanced distributed channel access (EDCA) mechanisms providing different access categories (ACs) for random channel access on links of a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) transmitting a transmit identifier-to-user priority (TID-to-UP) mapping to a STA/AP that will be operating as a transmitting STA/AP, from a STA/AP that will be operating as a receiving STA; (d)(ii) classifying frames that are transmitted to the STA operating as the receiving STA by TIDs; and (d)(iii) mapping the traffic of the TID to UP according to the TID-to-UP mapping by the STA operating as the receiving STA.

An apparatus for wireless communication in a network, the apparatus comprising: (a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an access point (AP) STA, for wirelessly communicating with other wireless stations (STAs) using carrier sense multiple access/collision avoidance (CSMA/CA) and enhanced distributed channel access (EDCA) mechanisms providing different access categories (ACs) for random channel access on links of a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) communicating to establish TID-to-UP mapping with a STA operating as a transmitter STA, from a STA operating as a receiving station; (d)(ii) utilizing the TID of the traffic stream (TS) for the frames, by the STA operating as the transmitter STA, if the frames belong to the traffic stream of the UP; and (d)(iii) utilizing the TID of the traffic category (TC) for the frames, by the STA operating as the transmitting STA, if the frames do not belong to the traffic stream of the UP, and thus are considered regular traffic.

An apparatus for wireless communication in a network, the apparatus comprising: (a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an access point (AP) STA, for wirelessly communicating with other wireless stations (STAs) using carrier sense multiple access/collision avoidance (CSMA/CA) and enhanced distributed channel access (EDCA) mechanisms providing different access categories (ACs) for random channel access on links of a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) performing communications in mapping more than two TIDs with values between 0 through 7 to a same AC; (d)(ii) wherein a first portion of said more than two TIDs are utilized for regular traffic, which is not associated with the traffic streams, of the UPs using the AC; and (d)(iii) wherein a second portion of said more than two TIDs are utilized for the traffic streams.

The apparatus or method of any preceding implementation, wherein frames are classified by TID of a stream classification service (SCS) traffic stream.

The apparatus or method of any preceding implementation, wherein the TID and the UP with the same value, which is not in the TID-to-UP mapping, follows the current IEEE 802.11 rules to differentiate traffic of that TID/UP.

The apparatus or method of any preceding implementation, wherein the traffic is first classified by TID, then mapped to UP according to the TID-to-UP mapping.

The apparatus or method of any preceding implementation, wherein multiple TIDs are mapped to a same UP.

The apparatus or method of any preceding implementation, wherein a TID with a value between 0 through 7 is mapped to a UP with a different value.

The apparatus or method of any preceding implementation, wherein a UP in the TID-to-UP mapping sets a differentiated services codepoint (DSCP) range of that UP to be zero.

The apparatus or method of any preceding implementation, wherein a differentiated services codepoint (DSCP) range of a UP in the TID-to-UP mapping is transferred to another UP which is not in the TID-to-UP mapping.

The apparatus or method of any preceding implementation, wherein a differentiated services codepoint (DSCP) range of a UP in the TID-to-UP mapping is transferred to a closest neighboring UP, which is not in the TID-to-UP mapping.

The apparatus or method of any preceding implementation, wherein a differentiated services codepoint (DSCP) range of a UP in the TID-to-UP mapping is transferred to a closest neighboring lower-priority UP that is not in the TID-to-UP mapping.

The apparatus or method of any preceding implementation, wherein a differentiated services codepoint (DSCP) range of a UP in the TID-to-UP mapping is transferred to another UP in the same AC.

The apparatus or method of any preceding implementation, wherein at most one of the UPs of the same AC is mapped during the TID-to-UP mapping.

The apparatus or method of any preceding implementation, wherein the TID-to-UP mapping is allowed to be performed only during the association procedure.

The apparatus or method of any preceding implementation, wherein the STA operating as the receiving STA uses EDCA functions (EDCAF) of the AC that is mapped to the UP to contend for the traffic of the TID that is mapped to the same UP.

The apparatus or method of any preceding implementation, wherein more than two TIDs with values between 0 through 7 are mapped to a same AC.

The apparatus or method of any preceding implementation, wherein one TID is shared by multiple UPs.

The apparatus or method of any preceding implementation, wherein one UP has multiple TIDs and at least one TID for its regular traffic.

The apparatus or method of any preceding implementation, wherein multiple UPs sharing one TID are the UPs using the same AC only.

The apparatus or method of any preceding implementation, wherein each TID is configured to be used for either regular traffic only, or traffic streams only.

The apparatus or method of any preceding implementation, wherein at least one TID is used for the regular traffic of the UPs using the same AC.

The apparatus or method of any preceding implementation, wherein the TID is mapped to the UP, while utilizing UP-to-AC mapping to map TID to AC traffic.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

21

TABLE 1

| | | | | | UP to AC Mapping |
|---|---|---|---|---|---|
| UP | 802.1D Designation | AC | AC *1 | AC *2 | |
| 1 | BK | AC_BK | BK | BK | Background |
| 2 | — | AC_BK | BK | BK | Background |
| 0 | BE | AC_BE | BE | BE | Best Effort |
| 3 | EE | AC_BE | BE | BE | Best Effort |
| 4 | CL | AC_VI | VI | A_VI | Video (alternate) |
| 5 | VI | AC_VI | VI | VI | Video (primary) |
| 6 | VO | AC_VO | VO | VO | Voice (primary) |
| 7 | NC | AC_VO | VO | A_VO | Voice (alternate) |

*AC 1-this is Transmit Queue designation (dot11 Alternate EDCA Activated = false or not present)
*AC 2-this is Transmit Queue designation (dot11 Alternate EDCA Activated = true)

What is claimed is:

1. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an access point (AP) STA, for wirelessly communicating with other wireless stations (STAs) using carrier sense multiple access/collision avoidance (CSMA/CA) and enhanced distributed channel access (EDCA) mechanisms providing different access categories (ACs) for random channel access on links of a wireless local area network (WLAN);

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) transmitting a transmit identifier-to-user priority (TID-to-UP) mapping to a STA/AP that will be operating as a transmitting STA/AP, from a STA/AP that will be operating as a receiving STA/AP;

(ii) wherein said transmit identifier-to-user priority (TID-to-UP) mapping comprises a request from the STA/AP that will be operating as the receiving STA/AP, and specifies which TIDs to map to which UPs;

(iii) wherein the STA/AP that will be operating as a transmitting STA/AP acknowledges the request, and upon being accepted a TID-to-UP mapping response is sent; and (iv) classifying frames, by the STA/AP operating as the transmitting STA/AP, so that these frames are transmitted to the STA/AP operating as the receiving STA/AP according to the user priorities (UPs) of the TID-to-UP mapping request which was accepted from the STA/AP operating as the receiving STA/AP.

2. The apparatus as recited in claim 1, wherein frames are classified by TID of a stream classification service (SCS) traffic stream.

3. The apparatus as recited in claim 1, wherein the TID and the UP with the same value, which is not in the TID-to-UP mapping, follows the current IEEE 802.11 rules to differentiate traffic of that TID/UP.

4. The apparatus as recited in claim 1, wherein the traffic is first classified by TID, then mapped to UP according to the TID-to-UP mapping.

5. The apparatus as recited in claim 1, wherein multiple TIDs are mapped to a same UP.

6. The apparatus as recited in claim 1, wherein a TID with a value between 0 through 7 is mapped to a UP with a different value.

7. The apparatus as recited in claim 1, wherein a UP in the TID-to-UP mapping sets a differentiated services codepoint (DSCP) range of that UP to be zero.

8. The apparatus as recited in claim 1, wherein a differentiated services codepoint (DSCP) range of a UP in the TID-to-UP mapping is transferred to another UP which is not in the TID-to-UP mapping.

9. The apparatus as recited in claim 1, wherein a differentiated services codepoint (DSCP) range of a UP in the TID-to-UP mapping is transferred to a closest neighboring UP, which is not in the TID-to-UP mapping.

10. The apparatus as recited in claim 1, wherein a differentiated services codepoint (DSCP) range of a UP in the TID-to-UP mapping is transferred to a closest neighboring lower-priority UP that is not in the TID-to-UP mapping.

11. The apparatus as recited in claim 1, wherein a differentiated services codepoint (DSCP) range of a UP in the TID-to-UP mapping is transferred to another UP in the same AC.

12. The apparatus as recited in claim 1, wherein at most one of the UPs of the same AC is mapped during the TID-to-UP mapping.

13. The apparatus as recited in claim 1, wherein the TID-to-UP mapping is allowed to be performed only during the association procedure.

14. The apparatus as recited in claim 1, wherein the STA/AP operating as the receiving STA/AP uses EDCA functions (EDCAF) of the AC that is mapped to the UP to contend for the traffic of the TID that is mapped to the same UP.

15. The apparatus as recited in claim 1, wherein more than two TIDs with values between 0 through 7 are mapped to a same AC.

16. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an access point (AP) STA, for wirelessly communicating with other wireless stations (STAs) using carrier sense multiple access/collision avoidance (CSMA/CA) and enhanced distributed channel access (EDCA) mechanisms providing different access categories (ACs) for random channel access on links of a wireless local area network (WLAN);

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) communicating to establish TID-to-UP mapping with a STA operating as a transmitting STA, from a STA operating as a receiving STA;

(ii) classifying frames, by the STA operating as the transmitting STA, so that these frames are transmitted to the STA operating as the receiving STA;

(iii) wherein said transmitting station utilizes the TID of a traffic stream (TS) for the frames, by the STA operating as the transmitter STA, responsive to determining that frames belong to the traffic stream of a user priority (UP); and (iv) utilizing the TID of a traffic category (TC) for the frames, by the STA operating as the transmitting STA, if the frames do not belong to the traffic stream of the UP, and thus are considered regular traffic.

17. The apparatus as recited in claim 16, wherein one TID is shared by multiple UPs.

18. The apparatus as recited in claim 16, wherein one UP has multiple TIDs and at least one TID for its regular traffic.

19. The apparatus as recited in claim 16, wherein multiple UPs sharing one TID are the UPs using the same AC only.

20. The apparatus as recited in claim 16, wherein each TID is configured to be used for either regular traffic only, or traffic streams only.

21. An apparatus for wireless communication in a network, the apparatus comprising:

(a) a wireless communication circuit, performing transmission of frames between the medium access control (MAC) layers of an IEEE 802.11 network as a wireless station (STA) which is a separate STA or as a STA in a multiple-link device (MLD), and operating as either a regular STA or an access point (AP) STA, for wirelessly communicating with other wireless stations (STAs) using carrier sense multiple access/collision avoidance (CSMA/CA) and enhanced distributed channel access (EDCA) mechanisms providing different access categories (ACs) for random channel access on links of a wireless local area network (WLAN);

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) performing communications in mapping more than two TIDs with values between 0 through 7 to a same AC;

(ii) wherein a first portion of said more than two TIDs are utilized for regular traffic, which is not associated with traffic streams of user priorities (UPs) using the AC; and (iii) wherein a second portion of said more than two TIDs are utilized for the traffic streams.

22. The apparatus as recited in claim 21, wherein at least one TID is used for the regular traffic of the UPs using the same AC.

23. The apparatus as recited in claim 21, wherein the TID is mapped to the UP, while utilizing UP-to-AC mapping to map TID to AC traffic.

* * * * *